United States Patent [19]
Chaplow et al.

[11] 3,765,910
[45] Oct. 16, 1973

[54] METHOD OF REMOVING UNDESIRABLE SOLIDS FROM COFFEE EXTRACT

[75] Inventors: Richard A. Chaplow; Ronald A. Hodgman, both of Quebec, Canada

[73] Assignee: General Foods, Limited, Toronto, Ontario, Canada

[22] Filed: Sept. 8, 1969

[21] Appl. No.: 855,970

[52] U.S. Cl. ............... 99/199 C, 62/58, 99/71, 99/205 C
[51] Int. Cl. ............... B01d 9/04, A23f 1/08
[58] Field of Search ............... 62/58; 99/199, 71

[56] References Cited
UNITED STATES PATENTS

| | | | |
|---|---|---|---|
| 2,408,260 | 9/1946 | Kellogg | 62/58 |
| 2,895,835 | 7/1959 | Findlay | 62/58 |
| 3,050,952 | 8/1962 | Marwil | 62/58 |
| 3,205,078 | 9/1965 | Lund | 62/58 |
| 3,283,522 | 11/1966 | Ganiaris | 62/58 |
| 3,362,178 | 1/1968 | Cottle et al. | 62/58 |
| 3,381,302 | 4/1968 | Reimus et al. | 99/71 |
| 3,404,007 | 10/1968 | Muller | 99/71 |
| 3,531,295 | 9/1970 | Ganiaris | 62/58 |

OTHER PUBLICATIONS

Sivetz & Foote, Coffee Processing Tech., 1963, Vol. 2, Avi Pub. Co., Westport Conn., pp. 14-21

*Primary Examiner*—Norman Yudkoff
*Assistant Examiner*—R. T. Foster
*Attorney*—LeFever, Guillinan and Hubbard

[57] ABSTRACT

Coffee extract is freeze concentrated in a crystallizer of the scraped wall type, having low residence time and a maximum delta T, which generates fine ice crystals and is not susceptible to clogging. The effluent slurry from the crystallizer is separated into its components in a basket-type batch centrifuge, which also is not susceptible to clogging. the separated ice from the centrifuge is melted, concentrated and added back to the mother liquor or concentrated liquid extract effluent of the centrifuge. Any insolubles present in the concentrated extract are then easily removed by clarification in a desludger type centrifuge. The clarified extract is frozen and freeze dried into a clean product, free of any undesirable insolubles.

10 Claims, 1 Drawing Figure

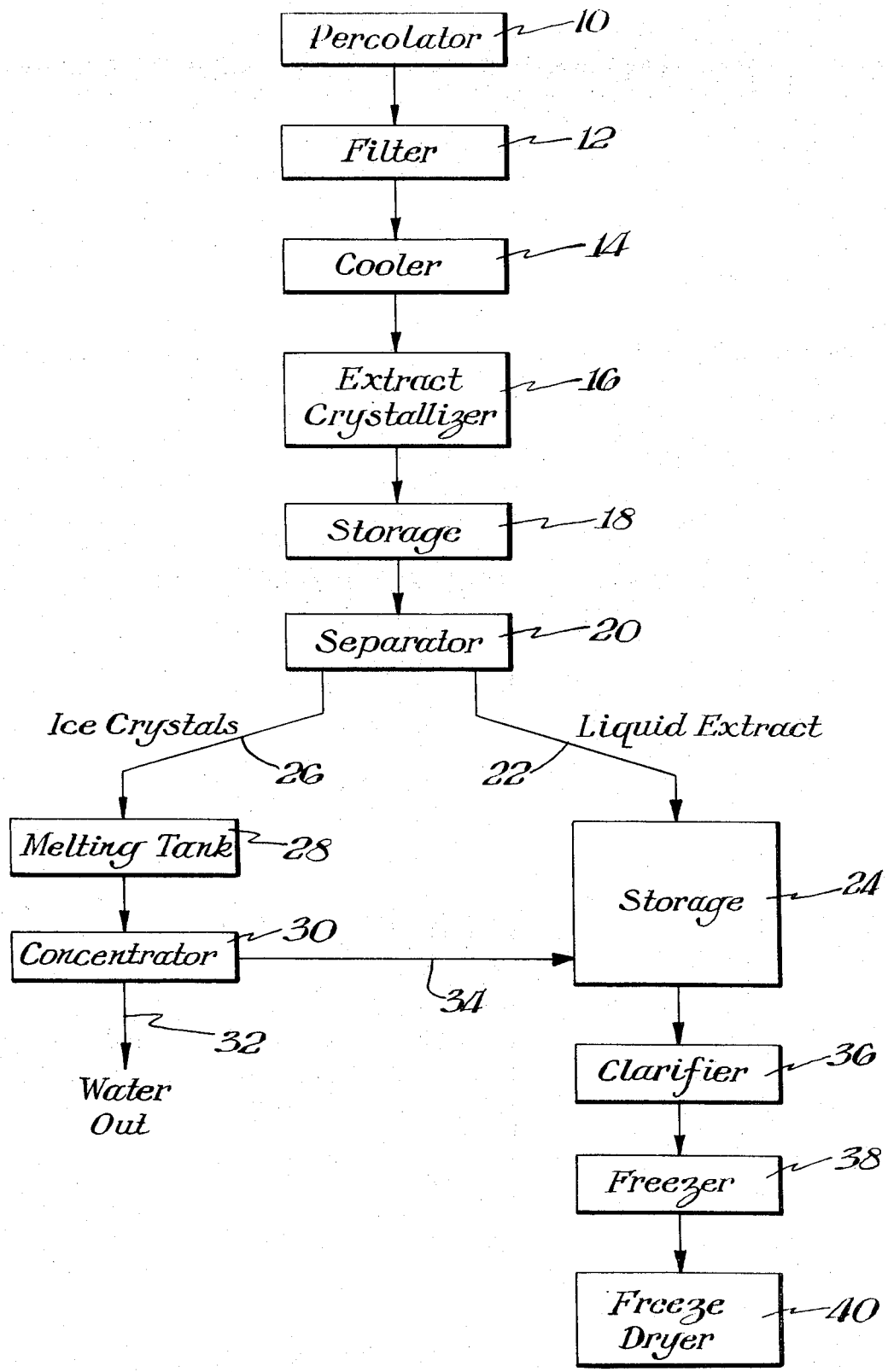

1

METHOD OF REMOVING UNDESIRABLE SOLIDS FROM COFFEE EXTRACT

BACKGROUND OF THE INVENTION

This invention relates to a process for removing undesirable insolubles from coffee extract during a process for the production of freeze dried coffee which utilizes freeze concentration. Freeze concentration is employed to reduce the water content and thus minimize the cost of freeze drying. Freeze concentration necessarily cools the coffee extract to relatively low freezing temperatures. This sometimes precipitates undersirable solids, including waxes, tars, sediments, etc., out of the extract. These precipitated solids tend to clog some types of freeze concentrating systems. Also present in coffee extract are certain insolubles which produce undesirable black spots, called specs, in the ultimate product if they are not removed. Steps have heretofore been taken to remove some insolubles from the extract prior to freeze concentration, such as by chilling and tempering as described in U.S. Pat. No. 1,407,410 to Zorn. This, however, does not always remove specs and also adds an additional process step, thus increasing costs and slowing production. An object of this invention is therefore to provide an efficient method for removing specs from freeze concentrated coffee extract, which minimizes processing time and cost.

SUMMARY

Coffee extract is maintained at temperatures of about 55° to 80°F and preferably between 60° and 70°F before freeze concentration to minimize formation of insoluble precipitates. Concentration of the extract is accomplished in equipment which is not susceptible to clogging by such solids, such as a crystallizer of the scraped wall type having low residence time, a maximum delta T, and which generates fine crystals. The effluent from the crystallizer is separated in a basket type batch centrifuge which also is not susceptible to clogging. The separated ice is melted, concentrated and added back to the mother liquor or concentrated liquid extract. Undesirable solids are then removed from the combined extract, for example, by clarification in a desludger type centrifuge. The clarified extract is frozen and freeze dried to a clean ultimate product free of specs.

BRIEF DESCRIPTION OF THE DRAWING

Novel features and advantages of the present invention will become apparent to one skilled in the art from a reading of the following description in conjunction with the accompanying drawing wherein similar reference characters refer to similar parts and in which the single figure is a schematic diagram of a process for freeze concentrating coffee extract which is an embodiment of this invention.

DESCRIPTION OF THE PREFERRED EMBODIMENT

This method utilizes concentrated coffee extract derived from any suitable means. The original extract is, for example, obtained from a percolator 10 and has a solids content of 20 percent to 30 percent, more commonly 24 percent to 28 percent. Extract in percolator 10 may be processed by any one of a number of conventional percolation techniques, forming no part of the present invention, from typically roasted and ground coffee blends.

Filter 12 removes solid matter from the extract as it exits from the percolator at elevated temperatures usually above 150°F. The extract is then cooled in Cooler 14 to room temperature or below to prevent flavor degradation, reduce the heat load on freeze concentration equipment and minimize precipitation of wax-like solids such as waxes, tars, sediments, etc., which might tend to clog processing equipment.

The extract is then supplied to crystallizer 16, which is of the scraped wall type having a minimum residence time and a relatively high delta T. Such a crystallizer is made by the Votator Division of Chemetron Corporation under the trademark VOTATOR. This type of crystallizer generates fine ice crystals and is not susceptible to clogging by the wax-like solids. The residence time in crystallizer 16 is from about 3 to 10 minutes, which is relatively low in comparison to the other types of crystallizers in which the extract is held for approximately two to four hours. Such low residence time minimizes precipitation of wax-like insolubles and avoids clogging. The relatively high delta T is, for example, from 35° to 50°F. The effluent from crystallizer 16, consisting of a slush of ice crystals and concentrated coffee extract, is delivered to storage tank 18 from which it is supplied to separator 20.

Separator 20 is, for example, a basket type batch centrifuge of the type described in Perry's *Chemical Engineer's Handbook*, Fourth Edition, by McGraw-Hill Book Co., Inc., Copyright 1963, pages 19-94, FIG. 19-145. This type of centrifuge traps wax-like solids in the ice layer which is plowed out of the basket. This prevents such wax-like insolubles from clogging the centrifuge screens.

Concentrated extract from separtor 20 is led through line 22 to storage tank 24. The plowed ice crystals are directed through line 26 to melting tank 28. The dilute extract in melting tank 28 is directed to concentrator 30, which is for example of the evaporative type. Water is removed at line 32 and the concentrate derived from the ice cake melt is added back through line 34 to storage tank 24. The flavor degradation caused by evaporation does not materially affect the flavor of the combined extract in tank 24 because it is a low percentage of the combined extract. Flavor degradation can be minimized, if desired, by utilizing a vacuum type evaporator. The combined extract is maintained in storage tank 24 a relatively short time such as 15 minutes to 2 hours and normally between 15 minutes and 1 hour.

The combined concentrated extract having a solids content of approximately 35 to 45 percent by weight is then heated to a temperature preferably about 50° to 80°F to facilitate clarification in the desludger type centrifuge. Undesirable insolubles are then easily removed in clarifier 36 of a type such as that marketed under the tradename WESTFALIA SEPARATOR. If these undesirable insolubles are not removed before freeze drying, they speckle the product with undesirable black spots which appear as unacceptable foreign matter in a reconstituted cup of the coffee.

The clarified concentrate extract is frozen in freezer 38 and ultimately dried in freeze dryer 40 to provide clean and flavorful freeze dried coffee.

We claim:

1. A method of removing undesirable solids from coffee extract being freeze concentrated comprising the steps of obtaining coffee extract of 20–30 percent solids, cooling the coffee extract to room temperature or below to minimize precipitation of wax-like solids, freezing the extract to form ice crystals, separating the ice srystals from the extract to form a concentrated extract, subsequently heating said separated concentrated extract to between 50°–80°F and clarifying the heated concentrated extract to remove said undesirable solids therefrom.

2. A method as set forth in claim 1 wherein said extract is maintained at about room temperatures prior to freeze concentration.

3. A method as set forth in Claim 1 wherein said freeze concentration employs a further cooling of the extract in a crystallizer of the scraped wall type having a minimum residence time and relatively high delta T to form a slush of ice crystals and concentrated coffee extract and separating in a centrifuge of the basket type which traps wax-like solids in the ice layer preventing clogging of the centrifuge screens.

4. A method as set forth in claim 3 wherein clarification is accomplished in a desludger type centrifuge.

5. A method as set forth in claim 1 wherein clarification is accomplished in a desludger type centrifuge.

6. A method as set forth in claim 1 wherein said freeze concentration involves the speparation of effluent into concentrated liquid extract and ice crystals, said ice crystals being melted, concentrated and added back to said concentrate liquid extract.

7. A method as set forth in claim 1 wherein said clarification is accomplished at temperatures between about 50 and 80°F.

8. A method as set forth in claim 1 wherein the extract is freeze concentrated in a crystallizer having a residence time ranging from about 3 to 10 minutes.

9. A method as set forth in Claim 1 wherein said extract is freeze concentrated in a crystallizer having a delta T of about 35° to 50°F.

10. The method of claim 4 wherein said ice crystals are further processed to recover solids employing steps consisting essentially of melting the ice, concentrating the ice, adding the melted ice to the concentrated coffee extract, clarifying the mixture and completely freezing the mixture.

* * * * *

UNITED STATES PATENT OFFICE
CERTIFICATE OF CORRECTION

Patent No. 3,765,910　　　　　　　　Dated October 16, 1973

Inventor(s)　　　RICHARD A. CHAPLOW, ET AL

It is certified that error appears in the above-identified patent and that said Letters Patent are hereby corrected as shown below:

In the Abstract, Line 7, before "separated" and after "clogging." the word --the-- should read --The--.

In Column 1, Line 21, after "U.S. Pat. No." change --1,407,410-- to --1,507,410--.

In Column 3, Line 5, after "ice" and before "from" change --srystals-- to --crystals--.

Signed and sealed this 17th day of September 1974.

(SEAL)
Attest:

McCOY M. GIBSON JR.　　　　　　　　C. MARSHALL DANN
Attesting Officer　　　　　　　　　Commissioner of Patents